US009687736B2

(12) United States Patent
Boult et al.

(10) Patent No.: US 9,687,736 B2
(45) Date of Patent: Jun. 27, 2017

(54) METHOD AND APPARATUS FOR CREATIVE STORY TELLING GAMES

(71) Applicants: Terrance Edward Boult, Colorado Springs, CO (US); William Faigen, Colorado Springs, CO (US); Christopher Kazimierz Malec, Manitou Springs, CO (US); Travis Aaron Ray, Castle Pines, CO (US)

(72) Inventors: Terrance Edward Boult, Colorado Springs, CO (US); William Faigen, Colorado Springs, CO (US); Christopher Kazimierz Malec, Manitou Springs, CO (US); Travis Aaron Ray, Castle Pines, CO (US)

(73) Assignee: Terrance Boult, Colorado Springs, CO (US)

( * ) Notice: Subject to any disclaimer, the term of this patent is extended or adjusted under 35 U.S.C. 154(b) by 241 days.

(21) Appl. No.: 14/603,036

(22) Filed: Jan. 22, 2015

(65) Prior Publication Data

US 2016/0214002 A1 Jul. 28, 2016

(51) Int. Cl.
*G06F 17/00* (2006.01)
*A63F 13/30* (2014.01)
*A63F 1/04* (2006.01)
*A63F 1/00* (2006.01)
*A63F 9/04* (2006.01)

(52) U.S. Cl.
CPC ............... *A63F 13/30* (2014.09); *A63F 1/04* (2013.01); *A63F 2001/008* (2013.01); *A63F 2009/0484* (2013.01)

(58) Field of Classification Search
USPC ........................ 463/1, 7, 9–11; 273/236, 269
See application file for complete search history.

(56) References Cited

U.S. PATENT DOCUMENTS 4,637,799 A * 1/1987 Bouchal .................. G09B 1/34
 273/292
4,684,135 A * 8/1987 Bouchal .................. A63F 3/00
 273/148 A

(Continued)

*Primary Examiner* — Ronald Laneau (57) ABSTRACT

This invention is a novel method of gameplay and game apparatus for playing for at least one player. The method of play elicits creativity by having players tell stories using their interpretation of abstract imagery. In one embodiment the game uses playing cards with abstract drawings. The game components may take other forms, such as a board game, or the game may be played in different media, such as electronic games, video games, computer games, and interactive network games. One aspect of novelty here is the use of abstract drawings, which the players can interpret in many different ways to expand the story. The context of the story, and possible side constraints, will prime the player's mind to see different things in each card. In this game of creativity and storytelling, players create and add to a story based on the abstract images. Testing has shown that this method of gameplay can improve players' perception of their creative ability. Various embodiments offer multiple methods of play and scoring, each adaption designed to engage different size of groups. Other embodiments adapt the method and apparatus for ideation and problem-solving.

20 Claims, 7 Drawing Sheets

(56) References Cited

U.S. PATENT DOCUMENTS

| | | | | |
|---|---|---|---|---|
| 5,435,726 A | * | 7/1995 | Taylor | A63F 3/04 273/263 |
| 7,513,502 B1 | * | 4/2009 | Nygren | A63F 1/04 273/138.1 |
| 8,596,640 B1 | * | 12/2013 | Kramlich | A63F 3/04 273/236 |
| 2006/0273516 A1 | * | 12/2006 | Silfies | A63F 1/00 273/292 |

* cited by examiner

METHOD AND APPARATUS FOR CREATIVE STORY TELLING GAMES

CROSS-REFERENCE TO RELATED APPLICATIONS

Not Applicable

FIELD OF THE INVENTION

The present invention relates to methods of gameplay and apparatus and devices useful for playing the games. More specifically, the invention relates to methods of gameplay and game apparatus for stimulating imagination and creativity in at least one player by story telling based on visual creativity in the form of the player's interpretation of abstract images such as ink blots, other forms of abstract art, or abstract forms from nature such as clouds.

BACKGROUND OF THE INVENTION

The use of storytelling games with pictures to stimulate ideas, creativity has a long history. We briefly review some of the most relevant prior art.

There is a wide range of storytelling games that combine methods of play with game components containing strictly words, e.g. In U.S. Pat. No. 3,891,209 issued Jun. 24, 1975; U.S. Pat. No. 3,779,557, AUS. Pat. No. 7,513,502B1, issued Apr. 7, 2009 and many others. These games may involve story telling but they do not stimulate visual creativity using abstract imagery.

In U.S. Pat. No. 1,379,871 issued May 31, 1921 teaches of a set of cards where each card depicts a scene and object or descriptive matter to be used as a game or puzzle. the object of the '871 game is to arrange all the cards in the proper order so as to tell a pre-defined story. The prescribed storyline and fixed images, however, limits overall creativity and does not depend on visual creativity.

A picture-based story telling game is disclosed in U.S. Pat. No. 4,684,135 issued Aug. 4, 1987, wherein each player is provided with a game card on which is imprinted pictorial illustrations and legends characterizing a predetermined number of different kinds of stories. The players randomly determine the characteristics of the story that are to be told. The player must tell the prescribed stories using the entire card. The cards are prescriptive, limiting the player's freedom and creativity and it does not depend on visual creativity.

U.S. Pat. No. 6,719,290B1, issued Apr. 13, 2004, teaches of a story telling and idea generation game. The invention is an apparatus of concentric-rings with each ring is adorned With text and/or graphics that represent words, ideas, persons, places, things, and times (days, months, years, centuries, etc.). As in previous invention's the graphics are intended to represent specific items, limiting its ability to stimulate visual creativity or connections between subconscious ideas.

Another pictorial story telling game is disclosed in, in US Patent application No. 2006/0040748 published Feb. 23, 2006. Here, a storytelling game is disclosed where the goal of the game is to work through a story and bring it a successful ending by choosing among possible story directions at story branch points. The game can include electronic card readers and multiple story cards. While cards and story telling are involved, the cards are again quite literally interpreted and the hence limit visual creativity and freedom of interpretation.

U.S. Pat. No. 7,494,127B2 issued Feb 24, 2009, teaches of a pictorial story telling game which is explicitly designed to stimulate creativity. The game uses cards with photo cards depicting a discrete scene place or object. Players use at least one of the selected cards to tell a story. A score is developed based on pre-determined characteristics of the story including story composition, the time taken to tell the story as well as the story having an explicit beginning, middle and end. The '127 patent relies again on very explicit depictions of discrete scenes/places, limiting the player's freedom and creativity. While the game of the '127 patent may engage one aspect of creativity, it does not depend on or engage the users' visual creativity, and the fixed images limit the player's freedom of choice while telling the story.

U.S. Pat. No. 8,596,640 B1, issued Dec. 3, 2013, teaches of a method of play wherein play emphasizes storytelling and story recounting abilities with a plurality of game elements for subjects of the story and a plurality of situational elements and players provide a story based on the paired subject element and selected situational element. While this provides for stories, it does not stimulate visual creativity or significant imagination as the subject and situation are prescribed.

Another area of related art is in stories generated from character, role-playing or battle games with or without collectible trading card elements. A typical example typical of such a game is a collectible trading card game incorporating elements of strategy and chance is found in U.S. Pat. No. 5,662,332, issued Sep. 2, 1997. The '332 patent teaches of a trading card game and method of play in which the game components include energy cards, and command or spell cards that utilize the energy to allow the player to attack, defend and modify the effect of other energy cards or spell cards. The game may also include creature cards. The goal of the game is to reduce the life points of other players to a level below one. The play is effectively telling a story of a magic-based battle between players, however the method of play does not draw on visual creativity and offers little freedom in story play. Rather the '332 game provides for each player to be able to construct their own library of cards, and play based on those cards. The trading of cards allows different players to have library. The trading/collecting is based on the function of the card, not because of the artwork on that card. One embodiment of the current invention is based on each player using a personalized repository of cards based in part on their abstract art content not based on their strategic value and power in the game.

The prior art does not provide for a method of game play that constructs stories based on creative visual interpretation of abstract images. This limits the use of visual creativity, the ability to see different interpretations/uses of the cards. Just as the art world saw a expansion of creativity based on progression from simple drawings, to realistic drawings, to photographs, to abstract art, the present invention expands creativity in the method of game play by using abstract imagery that leave the interpretation of what the imagery means to the user.

Furthermore, none of the aforementioned inventions teach of using the same core method of play to use used in a variety of ways to support different size groups or to be constructively in solving problems.

BRIEF SUMMARY OF THE INVENTION

This patent is for a new method of gameplay that offers many embodiments using the novel game method of storytelling based on abstract images. In most games the components represent a fixed concept or have explicit graphics to support the interpretation of the piece. In contrast to such games, the present invention teaches how (card) games are played to be more creative and freeform. The interpretation of the abstract imagery depends on the users' creativity and draw from the context and possible theme. The invention also offer offers multiple embodiments with different ways of scoring, each design to engage different group size or group characteristics Creativity often requires the linking of disparate elements. This invention draws on visual creativity, the creative interpretation of what one sees as the player links it to other elements of the story. In psychology, priming is a term to describe the effect that the concepts that are currently active in the brain, will impact decisions or outcomes of activities. In traditional games, the literal/descriptive nature of the graphics drives the mind quickly to a generally expected outcome. In this invention the novel game method allows the context of the story, and possible side constraints, to prime the player's mind, but forces them to be creative in what they "see" in the abstract imagery. The result is that they different things in each card. The abstract nature of the imagery taking away the mind's obvious choices thereby stimulating visual creativity. In this game of creativity and storytelling, players create and add to a story based on the abstract images. Interpretation of abstract inkblot drawings also has a long history in Psychology, though here we adapt it for a creativity-oriented game. Testing has shown that this method of gameplay can improve a player's perception of their creative ability as well as increasing their understanding that others view the world differently. Various embodiments offer multiple methods of play and scoring, each adaption designed to engage different size of groups.

Other elements of novelty in the invention include the game's method supporting different embodiments that allows different group sizes. In particular the method and apparatus apply to an individual, where as most storytelling games apply to two or more players. Other modes of play combine this invention's novel method and apparatus to with added rules to encourage conversation during play, and to support innovation and problem-solving.

DETAILED DESCRIPTION

The present invention is directed to a game for at least one player, based on story telling using the interpretation of abstract imagery.

In one embodiment, the game components include rules of play and a plurality of playing cards with abstract images on the cards. Players receive an initial set of cards and take turns extending the story based on what they see in the cards. The have to convince the judge or jury that the interpretation of the card and extension of the story makes sense, within any prescribed constraints.

In most embodiments, gameplay begins when the cards are placed in a reservoir pile and shuffled. A predetermined number of cards are distributed to each player In various embodiments players play from a fixed dealt set of cards. If there are condition cards or constraint cards, they may be dealt together or separately, e.g. dealing 3 condition cards and 5 playing cards with abstract drawings.

Some player starts the round, either by designation or by random selection. Said player starts the story based on one of the abstract images on one of the cards in their possession, the player may use an abstract image card or an abstract image on a condition statement card. As the first player tells the first part of the story, the card the player used to tell their part of the story is placed face up on the table or in a discard pile. In most embodiments, gameplay continues in a predetermined rotation, e.g. clockwise.

In multiple embodiments, the first player to no longer have cards in their possession wins the round. In one such embodiment, if a player fails to convince the judge/jury of their interpretation of the card or if the story fails to make sense, the player must draw an addition card. In another embodiment such a failure means the player must take back their card. Either way, a valid play reduces the number of cards in their hand while an invalid one keeps the number of cards the same.

In some embodiments, the game can also include other cards with scoring/condition statements on them in addition to or in place of abstract images. These condition statements are not required for the player to tell the story; these conditions may support a secondary scoring scheme or they may inject activities such as switching seats, getting everyone a drink, or everyone talking with a given accent for the round. The condition statements may execute based on the conversations going on around the game, so as to encourage such conversations in small to moderate groups. In some embodiments, the statements may allow the player with the card to play it out of turn, without embedding it in a story, and score points. In such an embodiment the player with the most point wins. The first player out of cards may receive added points.

Yet another embodiment, called Gestour Play, is designed for larger groups. In this embodiment one player starts the story and everyone else vies to continue it. The Gestour starts a story by playing a card and interpreting it. Other players vie simultaneously or in some gestour decided order, to convince said gestour that their interpretation of one of their cards is the best extension of the story. That extension is accepted and the player whose story was selected as becomes the new Gestour, and all other players draw another card. The first player out of cards wins. Because this mode engages all users in story telling at once, is evolves more stories with more creativity and also keeps more players engaged in the game at once.

In various embodiments at any point in time when a player cannot think of a way to continue the story, or if their stories is rejected, that player must draw from the reservoir pile of cards and their turn is skipped. When a player no longer has cards in their possession, that player has won the round. In other modes of play, designed to encourage conversation amount the group, additional cards with condition statements can be used to score points based on the conversation.

The invention's apparatus and method of play can be used to play enhanced versions of traditional card games, e.g. poker, rummy, war, go-fish. An example of such an enhancement, an embodiment could have traditional suite/value cards, e.g. 2, 3, 4 . . . with hearts, diamonds, clubs and spades in addition to the abstract imagery. Then the stories from the interpretation of the abstract imagery could allow a particular card to be used a "wild card" in the traditional game. For example in enhanced version of poker, telling the story that connects the jack of clubs with the queen of diamonds and the queen of hearts might allow the player to claim their hand has three queens. This embodiment adds an entertaining twist to traditional card games.

In another embodiment, players are allowed to bring their own subset of cards to the game and may even draw their own abstract art on cards. In such embodiments users may draw from their own reservoir and maintain their own discard pile so as to facilitate maintenance of card ownership. In most embodiments, players retain their card, but in other embodiments winners of round may keep all cards from that round or may choose one other players card to keep Players are always free to collect/trade cards outside of the game.

In another embodiment, the cards with abstract imagery are combined with questions from text-based cards such as Apples-to-Apples, or Card Against Humanities, where a dealer or judge reads the text cards and players choose from their game components with abstract imagery and tell a story that fits as a response to text statement/question.

In another embodiment, at least goal of the game is idea generation (ideation) for solving a real problem. The story becomes constrained to items related to some aspect of the problem such as the problem formulation, the problem stakeholders, potential side effects of the problem, problem solution or some other problem-related element. After discussing the problem element to be addressed, the game play is telling a story from the abstract images. It is best in this mode not to pass judgment on the story, but rather to take notes. The underlying concept for such an embodiment is that priming from the discussion of problem combines with the abstract art to allow the player's subconscious to creatively access non-obvious issues. The players can then discuss the story and try to relate it to actual practical solutions to the problem. One variation of this embodiment even supports a single player game, Solitary stories, where the lone player uses the card to and taps into their subconscious mind as they explore a problem and its possible solutions.

The invention has been tested for its ability to impact creativity and ideation in complex problem-solving. Pre/Post test surveys were used to analyze the perception of thirty-six subjects. The analyses addressed multiple dimensions including subject's creativity before and after playing as well as the invention's role in problem-solving. After 30 minutes of using a card-based embodiment of the invention, more than 75% of the students (p=0.012) felt they could learn to be more creative. There was also a statistically very significant (p=0.0001) improvement in subjects feeling of personal creativity. Moreover, when it comes to actual problem-solving, over 60% of the students felt the invention could help them be more creative in problem-solving. From an instructor's point of view, the teams came up with significantly more creative yet potentially viable solutions. In related testing with corporate innovation personnel we also measured statistically significant improvement in subjects feeling of creativity.

Figure 1:
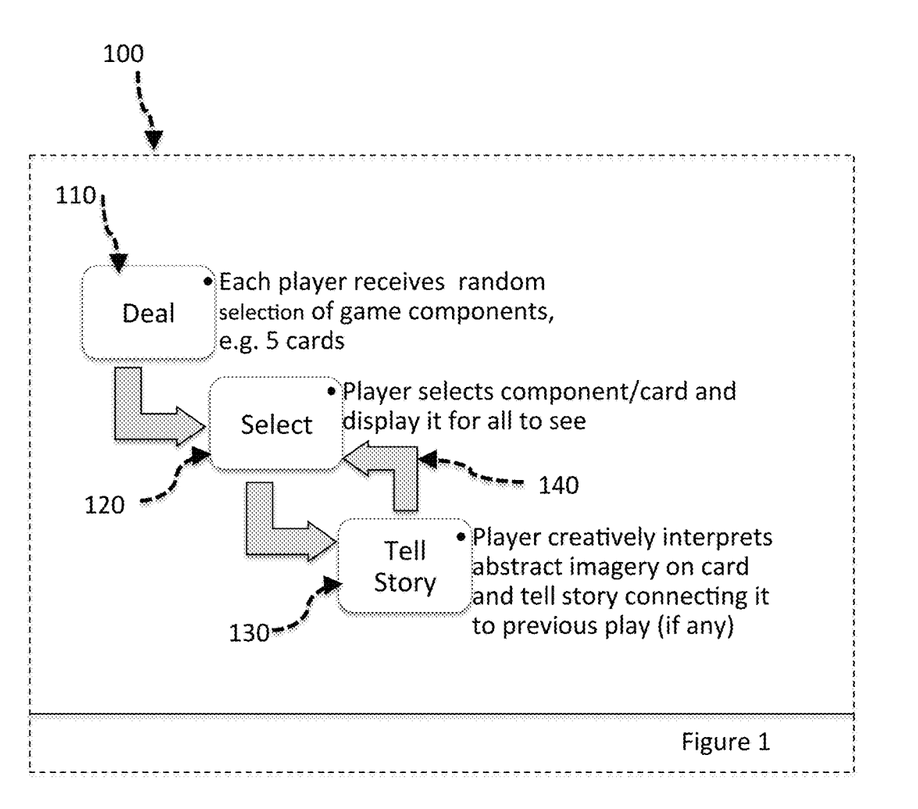
FIG. 1 shows the core elements of the invention's method of play (100) with the steps of dealing or random allocation of game components (110) followed by the step (120) of a player selecting a component to play and showing it to others followed by the step of telling the story (130) wherein the player creatively interprets the abstract imagery on the card and tells the story connecting it to the previous play (if any).
Figure 2:
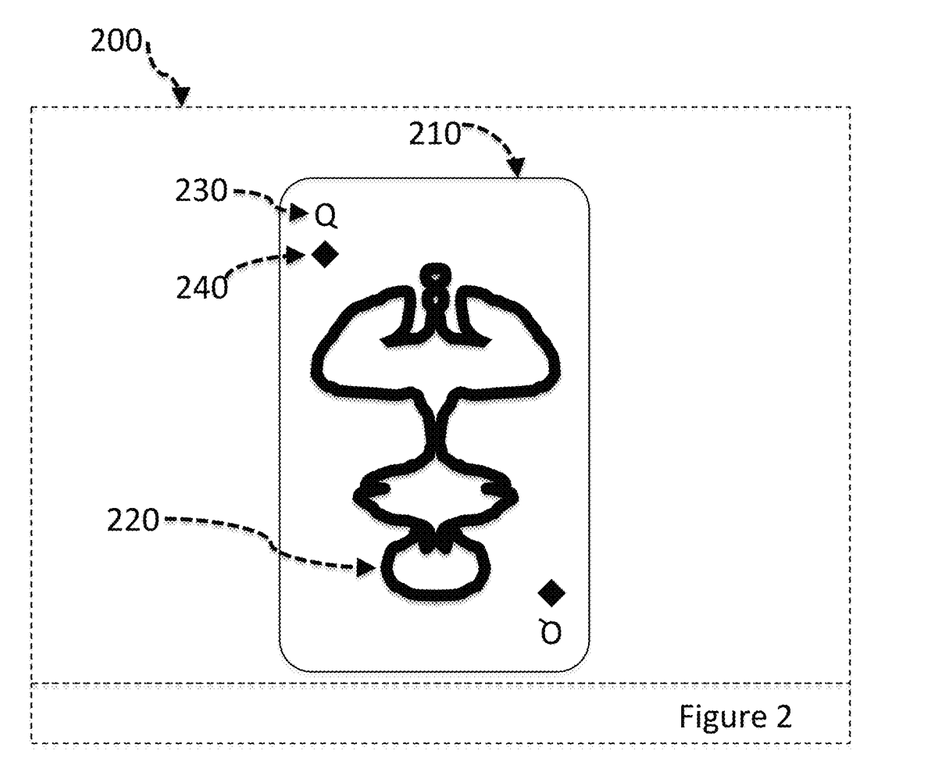
FIG. 2, shows a plan view (200) of an embodiment using playing cards (210) wherein the face of card shows with an example abstract imagery (220) as well as regular card rank (230) with Q for queen, and Suit (240) which in this example is diamonds. This type of embodiment of deck would generally have 54 cards, with standard card values and suits, A, 2, 3, 4, 5, 6, 7, 8, 9, 10, J, Q, K each of Spades, Hearts, Clubs, and Diamonds plus 2 jokers.

In one embodiment, the abstract imagery is included in playing cards which include standard card values and suits, A, 2, 3, 4, 5, 6, 7, 8, 9, 10, J, Q, K each of Spades, Hearts, Clubs, and Diamonds) in addition to the abstract imagery (FIG. 2—220). Rank (A, 2, J, Q, etc.) is printed as shown in FIG. 2—230. Suit is printed in FIG. 2—240. This embodiment allows dual use as a standard deck of cards as well as an enhanced mode of play that combines the invention's method of story telling with abstract imagery to make a card wild in standard games such as poker, rummy, go-fish, war, solitaire and many others.

Figure 3:
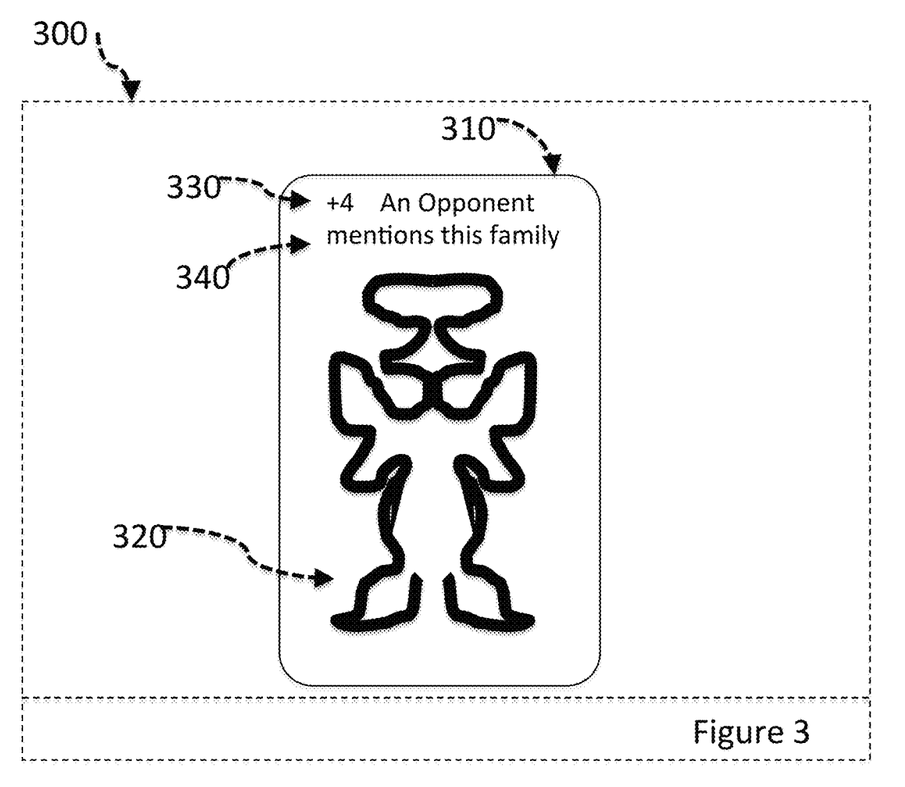
FIG. 3, shows a plan view (300) of an embodiment using playing cards (310) wherein the face of card shows with an example abstract imagery (320) as well as a point value (330) and a condition (340).

In one embodiment, one can have a deck with condition cards with the abstract imagery (FIG. 3—320) . Each one with a condition (FIG. 3—330) that determines when they can be played and a point value (FIG. 3—340) earned when they are played. This mode of scoring can be combined with other by assigning a fixed number, say 15 points, for the player that goes out of cards first. The two decks can be used in the same game, e.g. dealing players a fixed number of cards from each deck, allowing them to tell stories using either. This adds strategy as playing condition cards in the story will limit their ability to score points, but not being able to play reduces the chances of going out.

In another embodiment, the conditions on the game components specify movements on a playing board that occur when the game component is played, either by using it in a story telling by interpreting the abstract drawing, or when if it is played based on conversations.

Figure 4:
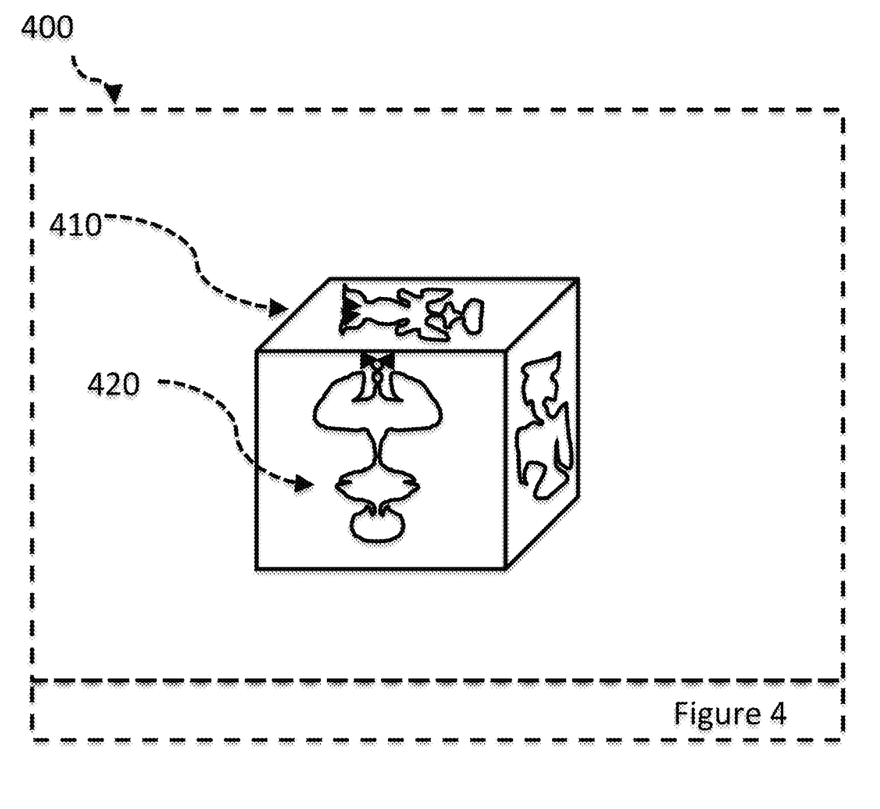
FIG. 4, show a perspective view of an embodiment (400) using a die (410) with abstract imagery (420) on each side.
Figure 5:
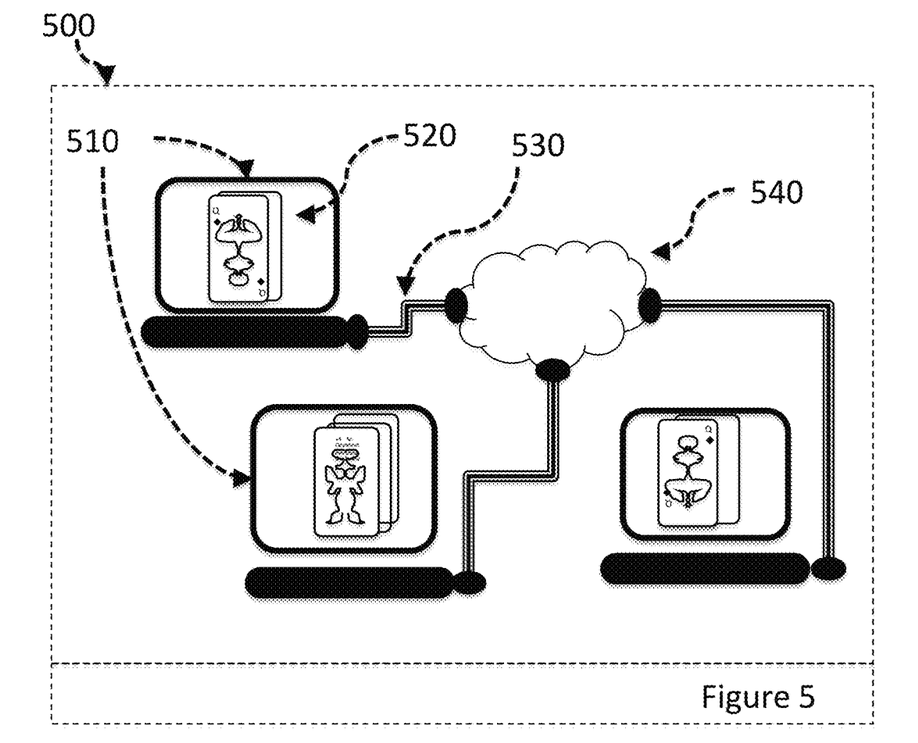
FIG. 5 shows an embodiment (500) wherein the computing devices (510) have digital displays of game components with abstract imagery (520) and where the devices are connected (530) to a network (540).
Figure 6:
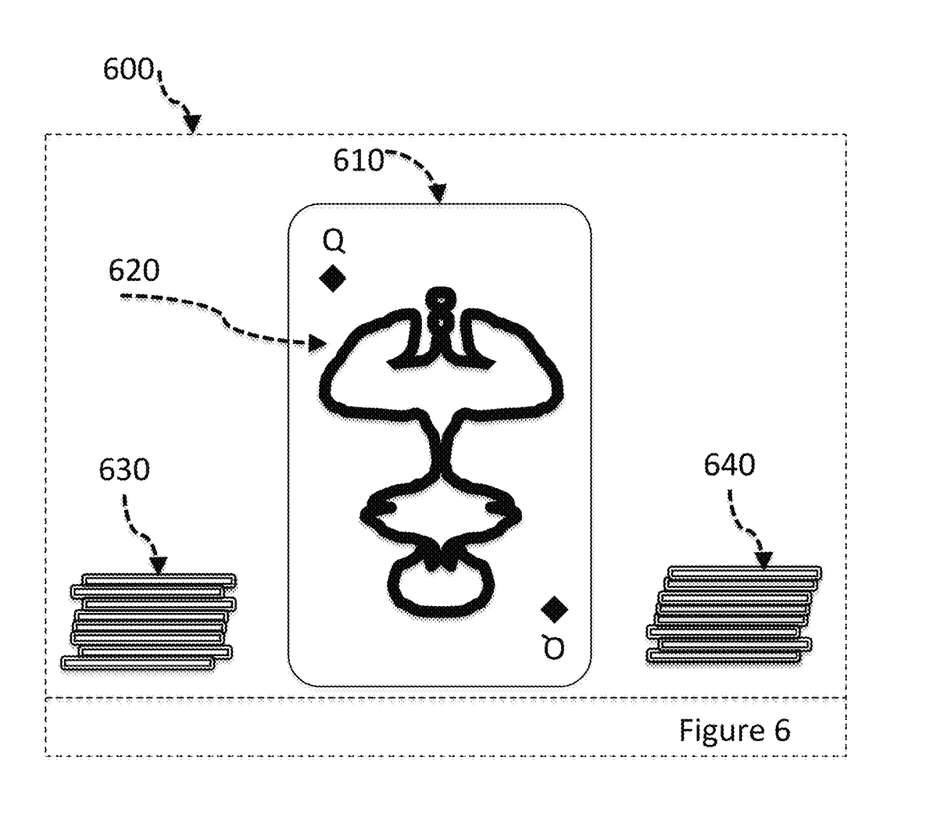
FIG. 6. Shows an embodiment (600) wherein the game components (610) with abstract imagery (620) make use of at least 2 reservoirs of components (630 and 640).
Figure 7:
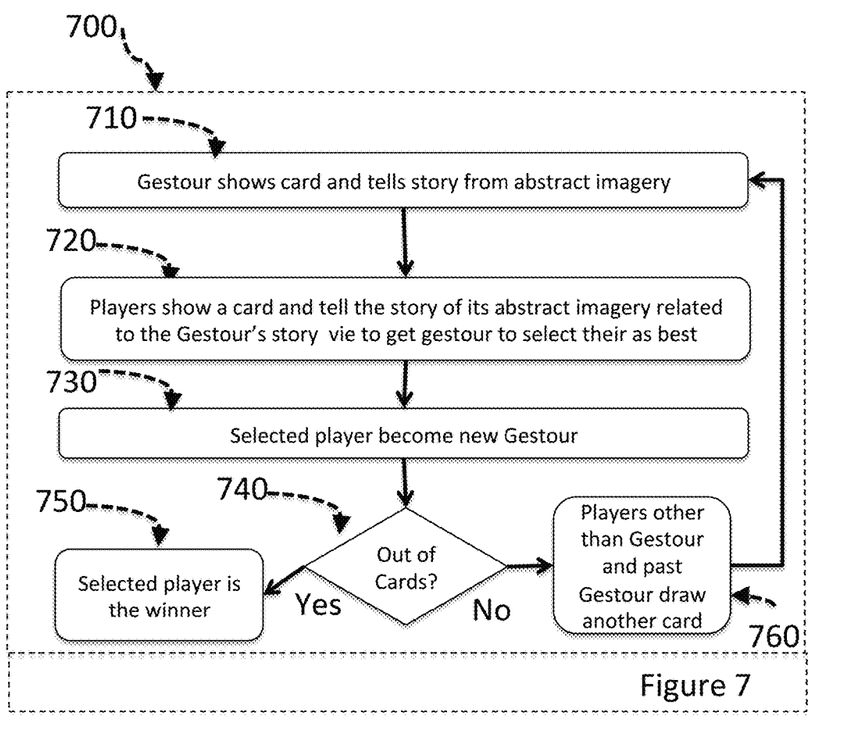
FIG. 7. Shows a method of play (700) designed for larger groups wherein a designated player, the Gestour interprets the abstract imagery on a card to tell a story (710) and other players choose one of their cards, tell the story of its abstract imagery as related to the Gestour's story and vie to convince the gestour their story is the best (720) with the selected player becoming the new gestour (730). If that was the selected player's last card (740), the selected player is declared the winner (750), otherwise the players other than the new and old Gestour draw new cards (760).

While the above descriptions have focused on the apparatus or article of manufacture being embodied being playing cards, in view of this disclosure, those skilled in the art will see how this game play method can easily be adapted to other forms, medium and uses which include but are not limited to dice games (FIG. 4), board games using dice or cards where board advancement rather the points is used to determine the winner, computer based games (FIG. 5) played either locally or on a network, dedicated games, browser-based games. While we have described the game as involving abstract imagery and the drawing shows abstract art, those skilled in the art will also see how the method and apparatus applies to other abstract imagery, e.g. telling stories based on the abstract imagery of clouds or of tea-leaves or of images of water waves, etc.

The invention claimed is:

1. A method and apparatus for playing games, which stimulates imagination and creativity the method and apparatus comprising:
   a. an apparatus for displaying abstract imagery, said imagery not being explicit graphics representing one or more fixed concepts, whereby the abstract nature of said imagery demands greater creativity of the player by removing obvious interpretations,
   b. a reservoir including a plurality of game components with imagery, wherein one or more one game components is an instance of said apparatus,
   c. randomizing the reservoir of game components
   d. each player obtaining an initial hand of a predetermined number of game components from said reservoir;
   e. A player choosing at least one game component from said player's hand and displaying the at least one game component in a means that enables the other players to see the imagery;
   f. Said player enhancing creativity by telling a story by interpreting a part of the abstract imagery on said apparatus, in which the player must be creative to find or "see" a story element hidden within said abstract imagery's shapes, forms, colors and textures, the story also being consistent with any predefined theme or story constraints and where the play is considered invalid if at least one player claims that said interpretation of a part of the abstract imagery is based upon, what seems to the at least one player, as being an obvious choice.

2. The method and apparatus of claim 1, wherein said the apparatus is least one playing card with abstract imagery.

3. The method and apparatus of claim 1, wherein said plurality of game components includes at least one die with at least one surface that shows abstract imagery.

4. The method and apparatus of claim 1, wherein said plurality of game components includes at interpreting at least one digital representation of abstract imagery.

5. The method and apparatus of claim 1 implemented as a computer program embodied on a video gaming system comprising a processor, non-transitory computer-readable storage medium, a video display and a player input controls which includes:
   a) a processor acting as a dealer for a reservoir including a plurality of game components with imagery
   b) computer code for receiving from the processor a first index for a reservoir element;
   c) computer code for using the index to generate or retrieve from memory a digital representation of abstract imagery is not explicit graphics representing fixed concepts,
   d) computer code for displaying said abstract imagery to a player;
   e) computer code for said player to enhance the story by inputting an interpretation a part of said abstract imagery, in which the player must be creative to find or "see" a story element hidden within the abstract imagery's shapes, forms, colors and textures, and wherein the play is considered invalid if the interpretation of the imagery is based on obvious choices.
   f) computer code to communicate the index of the reservoir element and the enhanced story to a video gaming system for display.

6. The method and apparatus of claim 1, wherein the reservoir is separated into at least two sub-reservoirs of game components and wherein a player may bring and maintain their own reservoir.

7. The method and apparatus of claim 1 wherein the abstract imagery is similar in form to an ink-blot.

8. The method and apparatus of claim 2, wherein a plurality of game components serve a dual purpose such as allowing their use as trading cards or traditional four-suit playing cards.

9. The method and apparatus of claim 1, wherein at least one game component contains a condition, a point-value, and an abstract image.

10. The method and apparatus of claim 9, wherein the scoring involves awarding points for items that take place in the conversation between players.

11. The method and apparatus of claim 1, wherein the story is constrained so as to support ideation to enhance problem-solving.

12. The method and apparatus of claim 1, wherein the story allows the player to interpret the game component as an answer or wild card within the context of the rules of a non-storytelling game, thereby enhancing the creativity of play in the non-story telling game.

13. An article of manufacture for playing story telling games with abstract imagery comprising:
   a) at least one reservoir of a plurality of game components wherein said plurality of game components contain imagery
   b) with at least one of said game components displaying abstract imagery that is not explicit graphics representing fixed concepts, whereby the abstract nature of the imagery takes away the mind's obvious choices thus stimulating creativity
   c) the rules for playing at least one game component includes the step of enhancing creativity by telling a story interpreting said abstract imagery, in which the player must be creative to find or "see" a story element hidden within said abstract imagery on said at least one game component, said story being consistent with any predefined theme or story constraints.

14. The article of claim 13, wherein said plurality of game components include at least one playing card with abstract imagery, wherein the play is considered invalid if the interpretation of all the imagery is obvious to other players.

15. The article of claim 13, wherein said plurality of game components include at least one die whose surfaces show abstract imagery.

16. The article of claim 13, wherein the abstract imagery is similar in form to an ink-blot.

17. The article of claim 13 wherein said plurality of game components include at least one digital representation of abstract imagery and where players communicate with other players via a network of computers, each player having a device on which to display the at least one digital representations of abstract imagery, and wherein the play is considered invalid if all the interpretation of the imagery is obvious to other players.

18. The article of claim 13 wherein a player may bring and maintain their own reservoir.

19. The article of claim 13, wherein the scoring involves points for items that take place in the conversation within the room.

20. The article of claim 13, wherein the story is restricted to be related to ideation to enhance problem-solving.

* * * * *